United States Patent Office 2,760,968
Patented Aug. 28, 1956

2,760,968

INORGANIC IODIDE CATALYZED TUNG OIL ISOMERIZATION

Frank C. Pack and Ralph W. Planck, New Orleans, La., assignors to the United States of America as represented by the Secretary of Agriculture No Drawing. Application December 4, 1953, Serial No. 396,355

4 Claims. (Cl. 260—405.6)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to a process of isomerizing alpha-eleostearates to beta-eleostearates.

Beta-eleostearic acid is a particularly reactive form of eleostearic acid and differs from the naturally occurring alpha-eleostearic acid in its rates of reaction, its physical and chemical properties and in the properties of its derivatives, such as esters, amides, soaps, Diels-Alder addition products etc. Beta-eleostearins are glycerides of beta-eleostearic acid having numerous valuable applications, such as drying oil components, by virtue of their reactive olefinic groups.

In general, in accordance with the process of this invention, alpha-eleostearates are isomerized by contacting them with at least one inorganic iodide particularly the iodides of ammonium, sodium, potassium, lithium, cadmium, or mercury. In accordance with a preferred process, the alpha-eleostearates are contacted with the inorganic iodides, isolated, and then allowed to isomerize in the absence of the iodides. The isomerization can be conducted in the presence or absence of actinic light, but is generally somewhat more rapid in the presence of the light.

Beta-eleostearins produced by isomerizing tung oil in accordance with this invention can be isolated or purified by conventional processes for isolating or purifying individual glycerides, or can be employed in the form of mixtures essentially comprising beta-eleostearins mixed with the glycerides of other fatty acids.

Particular esters or other derivatives of the beta-eleostearic acid can be prepared either by preparing the corresponding derivatives of alpha-eleostearic acid and then isomerizing the derivatives or by first isomerizing alpha-eleostearic acid and preparing the derivative from beta-eleostearic acid.

Alpha-eleostearates which can be employed in the present process include alpha-eleostearic acid or its pure mono-, di-, or triglycerides or mixtures thereof in which the acyl radicals comprise the alpha-eleostearyl radical or the alpha-eleostearyl radical and other radicals with which it is copresent in tung oil, or other esters of alpha-eleostearic acid with mono- or polyhydric alcohols, or any other derivative of alpha-eleostearic acid which will not react detrimentally with the iodides used. If the alpha-eleostearates are solid, it is preferable to dissolve them in suitable solvents before addition of the iodide. Tung oils containing from about 70–80% alpha-eleostearates are preferred starting materials for employment in the present process.

The inorganic iodides can be hydrated or anhydrous inorganic iodides. Illustrated examples of suitable iodides include the iodides of ammonium, sodium, potassium, lithium, cadmium, and mercury. The inorganic iodides can be employed in the form of free granules, in the form of particles or coatings deposited upon an inert carrier such as diatomaceous earth, fuller's earth, or the like, or in the form of aqueous solutions.

The alpha-eleostearates are preferably contacted with the iodide, at a temperature at which the eleostearates or mixtures containing them are liquid. The so-contacted alpha-eleostearates are preferably isolated from contact with the iodides prior to the occurrence of extensive isomerization, to facilitate the purification of the higher melting derivatives of beta-eleostearic acid. In the case of tung oils containing from 70 to 80 percent alpha eleostearin, a contact time of from about 0.5 to 3 hours is generally sufficient. Such oils after being contacted with the iodides and then isolated, generally solidify when allowed to stand one or two days at normal room temperature, and such behavior indicates a satisfactory extent of isomerization. In any case the contact time required to cause the desired degree of isomerization after isolation of the iodides can readily be determined by testing small samples with varying contact times.

The alpha eleostearates can be contacted with and isolated from the iodides by a variety of procedures. For example, the liquid alpha-eleostearates, or solutions thereof, can be: slurried with small particles of solid iodide and isolated by filtration; passed one or more times over a filter bed or carrier on which solid iodide is deposited; or mixed with an aqueous solution of the iodides and separated by decantation.

The following examples illustrate details of the invention:

Example 1

Powdered potassium iodide (1.0 g.) was stirred into 100 g. of normal, screw-pressed tung oil in a glass bottle and placed by a window where it was exposed to sunlight. The following morning there was a coating of white precipitate on the side of the bottle toward the window. In 2 days the entire mass was solid.

A control sample containing no potassium iodide but stored in the same illumination was unchanged.

Example 2

Powdered potassium iodide (1.0 g.) was stirred into normal screw-pressed tung oil and allowed to stand at room temperature for 3 hours. The oil which showed no evidence of change was filtered to remove the potassium iodide and the clear oil was stored in daylight but away from sunlight. The next morning the treated oil had changed to a semi-solid mass containing about 50% solid. In 2 days the entire mass appeared solid.

Another sample of the same oil (not subjected to the potassium iodide treatment) was stored in the same conditions of illumination for over one year without undergoing visible change.

Example 3

Powdered cadmium iodide (0.1 g.) was stirred into 5.0 g. of tung oil and the mixture stored in the laboratory where it was exposed to some sunlight. It solidified in 3 days. Similar results were obtained with the use of mercuric iodide, and ammonium iodide.

Example 4

A saturated solution of potassium iodide (1.0 ml.) was shaken with 100 ml. of normal, liquid tung oil and stored in a clear flask. After 6 hours of exposure to daylight (not sunlight) in the laboratory the flask was placed in a dark cabinet where the oil became solid in 4 days.

Example 5

Twenty grams of a diatomaceous earth prepared for use as a filter aid was moistened with water containing 3 g. of KI and air dried. A portion of the product was made into a slurry with tung oil and formed into a bed 30 cm. deep in a 20-mm. tube. Tung oil drawn through at a rate of 20 ml./hr. began to precipitate after exposure to daylight for 2 days.

*Example 6*

Saturated potassium iodide solution (2 ml.) was added to a solution of 20 g. of alpha-eleostearic acid (95% purity) dissolved in 80 grams of petroleum ether. After standing 4 hours crude beta-eleostearic acid began to precipitate.

We claim:

1. A process of isomerizing alpha-eleostearates to beta-eleostearates, comprising, contacting at room temperature for a period of at least 0.5 hour a liquid containing at least one eleostearate with at least one inorganic iodide of the group consisting of the iodides of ammonium, sodium, potassium, lithium, cadmium, and mercury.

2. A process of isomerizing to a solid at room temperature normally liquid tung oil, comprising, contacting the liquid tung oil at room temperature for a period of at least 0.5 hour with at least one inorganic iodide of the group consisting of the iodides of ammonium, sodium, potassium, lithium, cadmium and mercury.

3. A process of isomerizing alpha-eleostearates to beta-eleostearates, comprising, contacting at room temperature for a period of at least 0.5 hour a liquid containing at least one alpha-eleostearate with at least one inorganic iodide of the group consisting of the iodides of ammonium, sodium, potassium, lithium, cadmium, and mercury, isolating the liquid and allowing the alpha-eleostearate contained in the isolated liquid to isomerize to beta-eleostearate in the absence of the inorganic iodide.

4. A process of isomerizing to a solid at room temperature, normally liquid tung oil containing from about 70 to 80% alpha-eleostearates, comprising, contacting the liquid tung oil at room temperature for a period of at least 0.5 hour with at least one inorganic iodide of the group consisting of the iodides of ammonium, sodium, potassium, lithium, cadmium, and mercury, isolating the liquid oil, and allowing the alpha-eleostearates contained in the isolated oil to isomerize to beta-eleostearates in the absence of the inorganic iodide.

References Cited in the file of this patent
UNITED STATES PATENTS 2,411,113   Ralston et al. _____ Nov. 12, 1946

OTHER REFERENCES

"Studies on Gelation of Tung Oil, XIV–XV," by Monzi Tatimori, J. Soc. of Chem. Ind., Tokyo, suppl. binding, vol. 44, pp. 7–8 (1941).

"Polymerization of Tung Oil, VII, Effects of Various Inorganic Substances Upon the Gelation of Tung Oil," by Monzi Tatimori, Bulletin of the Chem. Soc. of Japan, vol. 16, pp. 75–81 (1941).